(12) United States Patent
Morenko et al.

(10) Patent No.: US 9,879,606 B2
(45) Date of Patent: Jan. 30, 2018

(54) METHOD OF SUPPLYING FUEL TO AN INTERNAL FUEL MANIFOLD

(71) Applicant: Pratt & Whitney Canada Corp., Longueuil (CA)

(72) Inventors: Oleg Morenko, Oakville (CA); Bryan Olver, Nobleton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 411 days.

(21) Appl. No.: 14/444,229

(22) Filed: Jul. 28, 2014

(65) Prior Publication Data

US 2016/0025009 A1 Jan. 28, 2016

(51) Int. Cl.
*F02C 7/22* (2006.01)
*F02C 7/14* (2006.01)

(52) U.S. Cl.
CPC .............. *F02C 7/222* (2013.01); *F02C 7/14* (2013.01); *F05D 2260/213* (2013.01); *F05D 2260/232* (2013.01)

(58) Field of Classification Search
CPC ...... F02C 7/222; F02C 7/14; F05D 2260/213; F05D 2260/232; F23R 3/283
IPC .................. F02C 7/222,7/14; F05D 2260/213, 2260/232; F23R 3/283
See application file for complete search history.

(56) References Cited

U.S. PATENT DOCUMENTS

| 5,335,490 | A | 8/1994 | Johnson et al. |
| 5,579,645 | A | 12/1996 | Prociw et al. |
| 7,481,059 | B2 | 1/2009 | Andersson et al. |
| 7,694,521 | B2 * | 4/2010 | Ohta ........................ F23R 3/343 60/740 |
| 7,827,795 | B2 * | 11/2010 | Hicks ........................ F02C 3/30 60/39.83 |

* cited by examiner

*Primary Examiner* — Pascal M Bui Pho
*Assistant Examiner* — Stefan Ibroni
(74) *Attorney, Agent, or Firm* — Norton Rose Fulbright Canada LLP

(57) ABSTRACT

The described method of supplying fuel to an internal fuel manifold of a bypass gas turbine engine includes directing a fuel flow through a fuel fairing having an outer surface exposed to a cool bypass airflow, directing the fuel flow in the fuel fairing through a heat exchanging structure on the outer surface of the fuel fairing to cool the fuel flow being below a coking temperature of the fuel, and then feeding the cooled fuel flow from the fuel fairing to the internal fuel manifold.

15 Claims, 5 Drawing Sheets

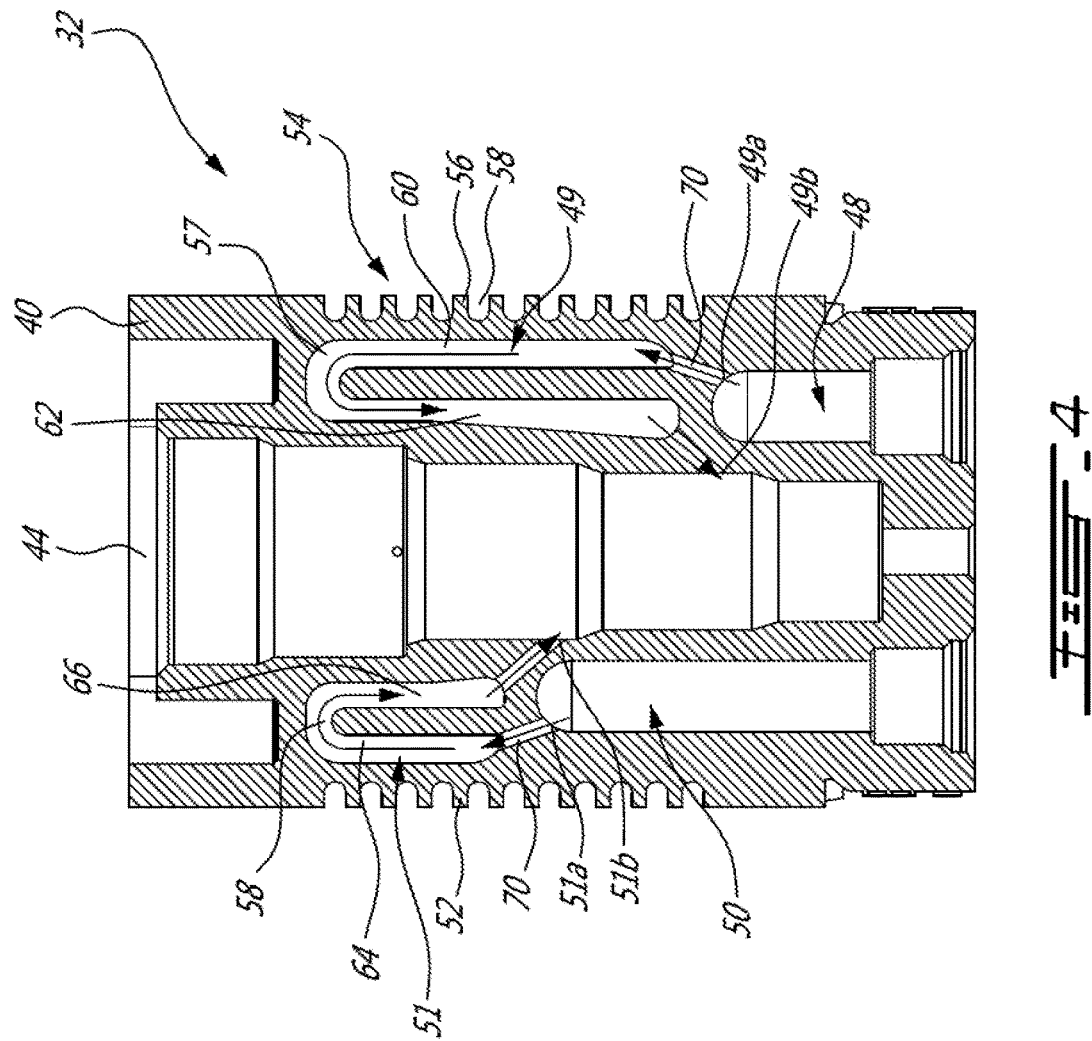

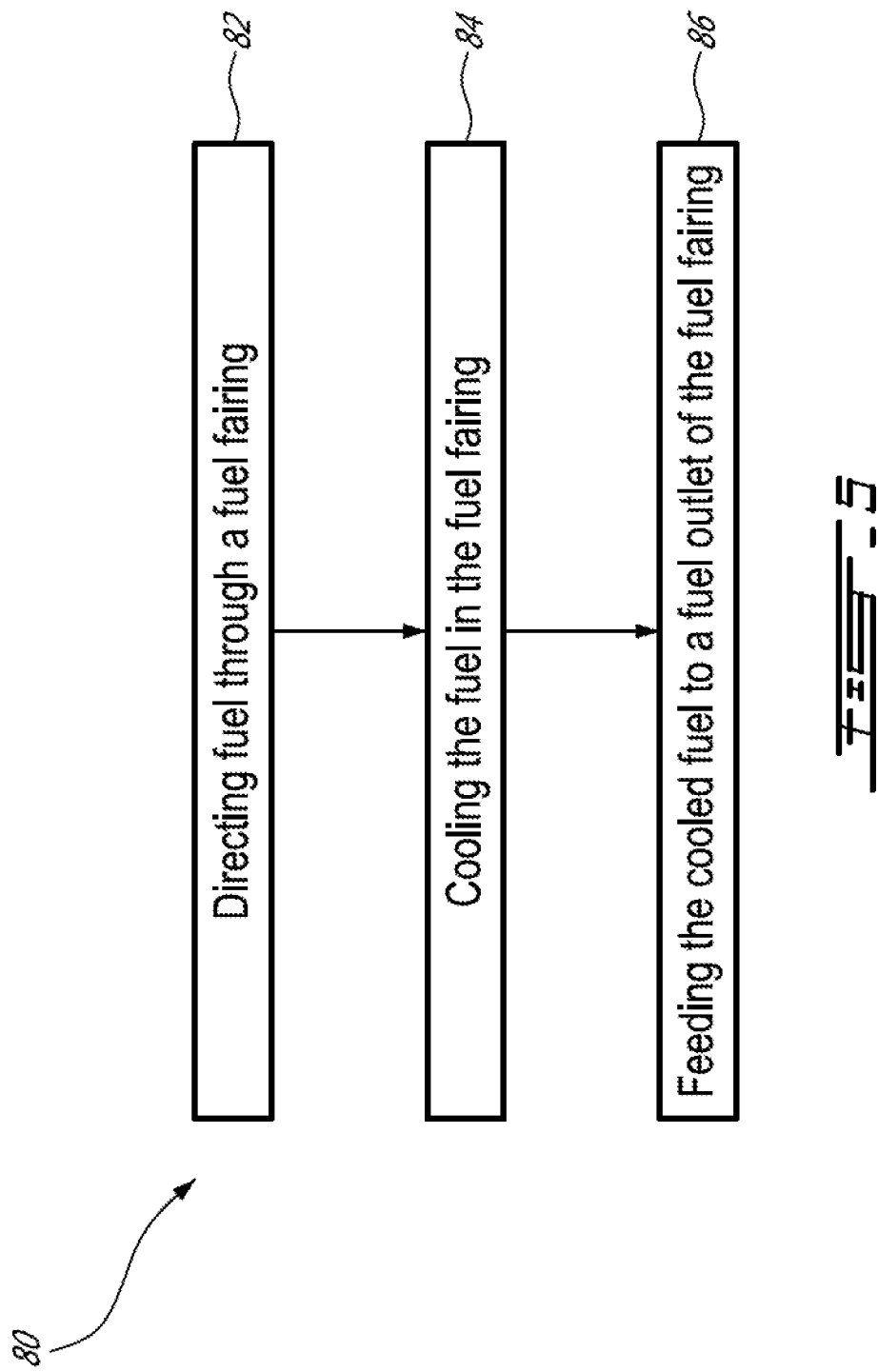

METHOD OF SUPPLYING FUEL TO AN INTERNAL FUEL MANIFOLD

TECHNICAL FIELD

The application relates generally to gas turbine engines and, more particularly, to internal fuel manifolds.

BACKGROUND

Gas turbine engine internal fuel manifolds are typically located inside the engine case adjacent the engine combustor, and thus reside in a hot environment. When exposed to high temperatures, the fuel may, in some cases, solidify into coke. The solidified fuel may block the nozzles of the internal fuel manifold and in turn impair combustion.

SUMMARY

There is provided a method of supplying fuel to an internal fuel manifold of a bypass gas turbine engine, the method comprising: directing a fuel flow through a fuel fairing, having an outer surface exposed to a cool bypass airflow; directing the fuel flow in the fuel fairing through a heat exchanging structure on the outer surface of the fuel fairing to cool the fuel flow below a coking temperature of the fuel; and subsequently feeding the cooled fuel flow from the fuel fairing to the internal fuel manifold.

There is also provided a method of supplying fuel to an internal fuel manifold of a gas turbine engine, the method comprising: directing fuel through a fuel fairing, the fuel fairing being in fluid flow communication with the internal fuel manifold, the fuel fairing having an outer surface exposed to cool bypass airflow; cooling the fuel in the fuel fairing below a predetermined temperature using a plurality of heat exchanging structures disposed on the outer surface of the fuel fairing, the predetermined temperature being below a coking temperature of the fuel; and subsequently feeding the cooled fuel from a fuel outlet of the fuel fairing to a fuel inlet tube of the internal fuel manifold, so as to supply cooled fuel to the internal fuel manifold.

There is also provided a method of reducing coking in an internal fuel manifold of a bypass gas turbine engine, the method comprising: i) cooling a flow of fuel below a predetermined temperature by directing the fuel through a fuel fairing located at least partially within a bypass duct of the gas turbine engine, at least an outer surface of the fuel fairing being exposed to cool bypass airflow through the bypass duct; and then ii) supplying the cooled fuel from the fuel fairing to the internal fuel manifold.

There is further provided a bypass gas turbine engine including: a bypass duct carrying cool air; an internal fuel manifold including a fuel inlet tube; and a fuel fairing disposed at least partially in the bypass duct and in fluid flow communication with the internal fuel manifold, the fuel fairing including: a fairing body having an outer surface exposed to the cool air flowing within the bypass duct, a central bore defined in a fairing body and receiving the inlet tube of the internal fuel manifold, and at least one fuel inlet and at least one fuel outlet defined in the fairing body; at least one fuel channel extending through the fairing body between the at least one fuel inlet and the at least one fuel outlet, the at least one fuel channel being in heat transfer communication with the outer surface of the fairing body; and a plurality of heat exchanging structures disposed on the outer surface and providing a heat transfer surface having a surface area greater than a corresponding outer surface without the plurality of heat exchanging structures.

BRIEF DESCRIPTION OF THE DRAWINGS

Reference is now made to the accompanying figures in which:

FIG. 4 is a partial schematic cross-sectional view along the line 4-4—in FIG. 3 of the fuel fairing; and FIG. 5 is a flow chart of a method of supplying fuel to an internal fuel manifold of the gas turbine engine of FIG. 1 using the fuel fairing of FIG. 2.

DETAILED DESCRIPTION

Figure 1:
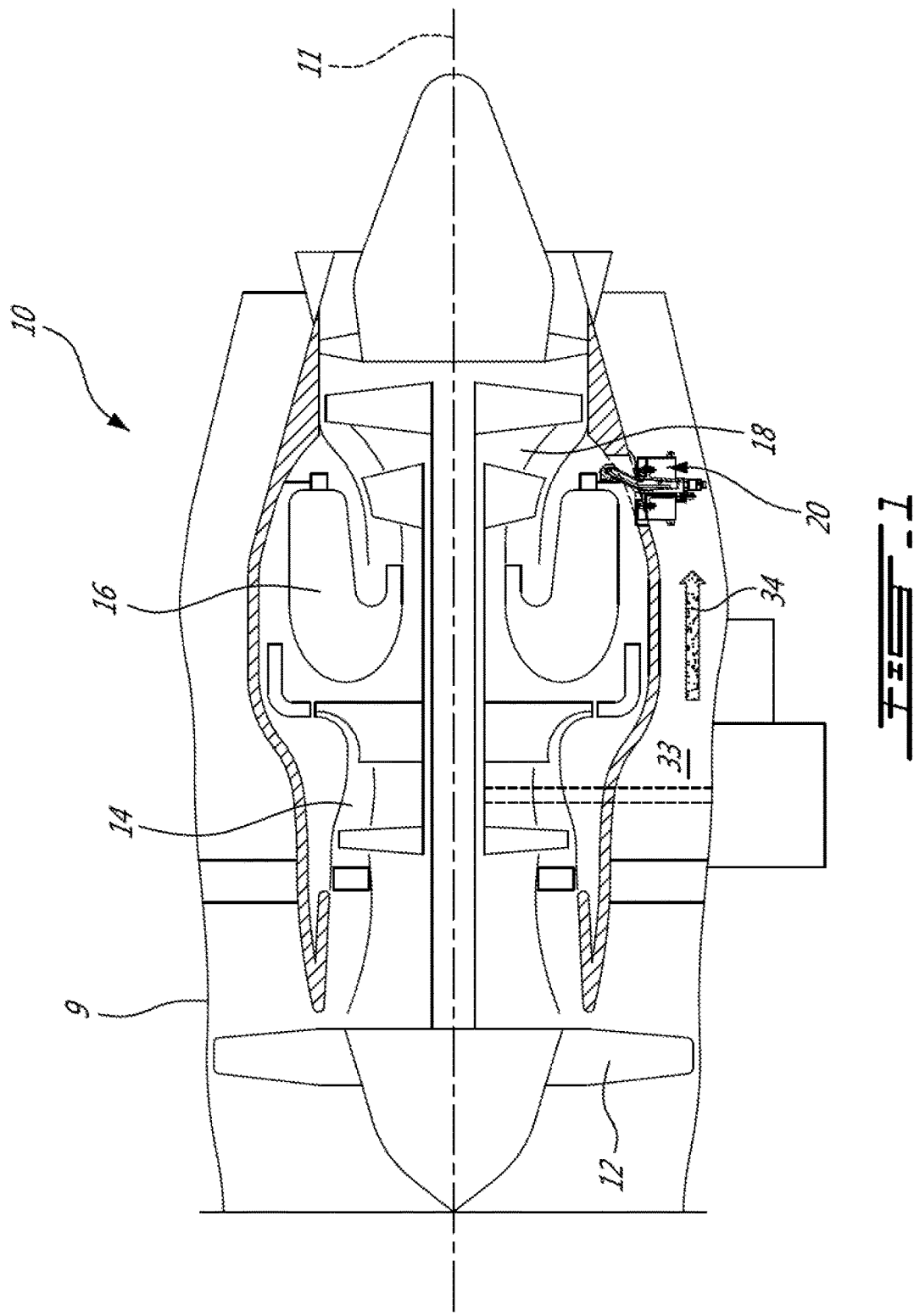
FIG. 1 is a schematic cross-sectional view of a gas turbine engine.

FIG. 1 illustrates a gas turbine engine 10, in this non-limiting example, a turbofan, of a type preferably provided for use in subsonic flight, generally comprising in serial flow communication inside an engine casing 9: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
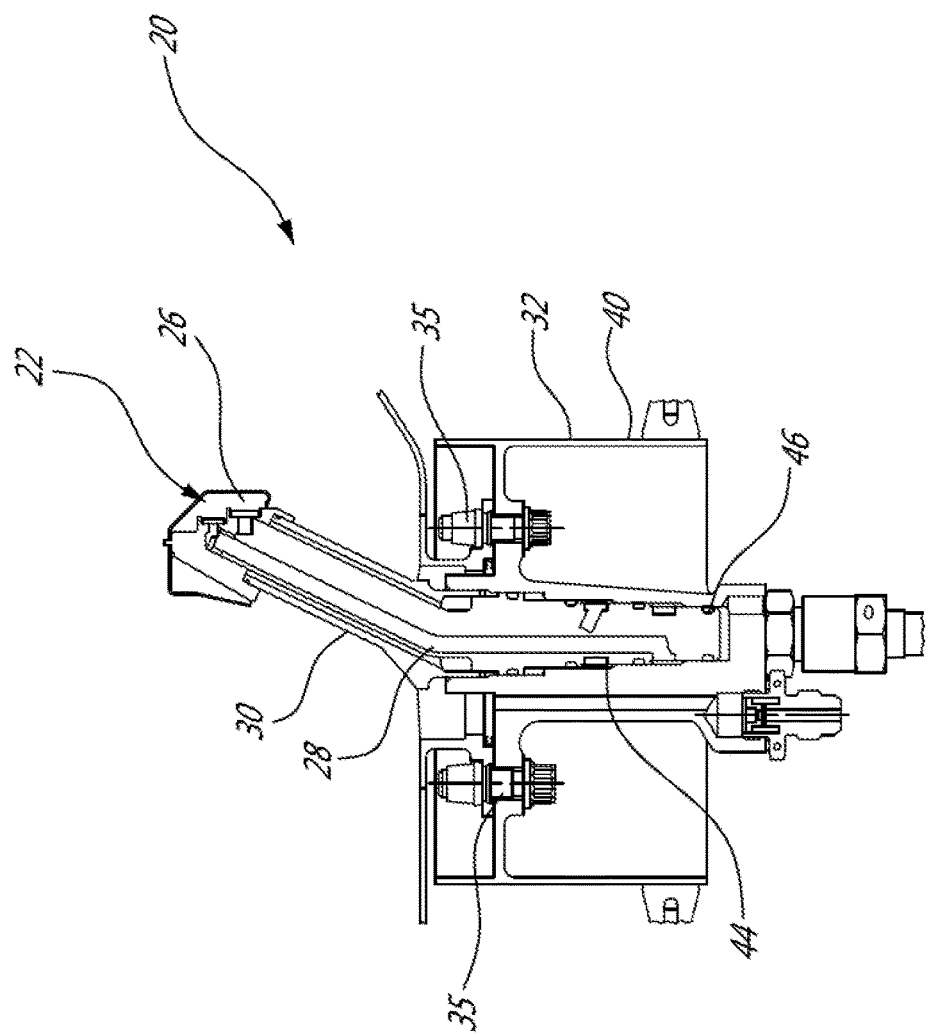
FIG. 2 is a schematic cross-sectional view of a fuel fairing for the gas turbine engine of FIG. 1 shown with a fuel inlet tube inserted therein.

Referring to FIG. 2, the fuel injection system 20 includes at least one fuel conveying member through which fuel flows. In the exemplary embodiment, the fuel injection system includes a fuel manifold ring 22 which is mounted adjacent to the combustor 16 in the gas turbine engine 10. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the fuel manifold ring 22 via a manifold inlet channel 28 defined in a fuel inlet tube 30. The fuel inlet tube 30 is radially extending from a lower portion of the fuel manifold ring 22. Fuel is distributed within the manifold ring 22 such that fuel flow is provided to each of the fuel nozzles assemblies 26.

The fuel inlet tube 30 is received in a fuel fairing 32. The fuel fairing 32 is disposed outside the combustor 16, in a zone that is cooler than the combustor 16. In the embodiment shown in the Figures, the fuel fairing 32 is disposed within the bypass air duct 33 which includes a core of high velocity flow 34 of air. The flow 34 of air is a flow of air that hasn't been used in the combustion and is a result cooler than an environment in and around the combustor 16. The fuel fairing 32 is connected to the engine casing 9 via bolts 35.

Figure 3:
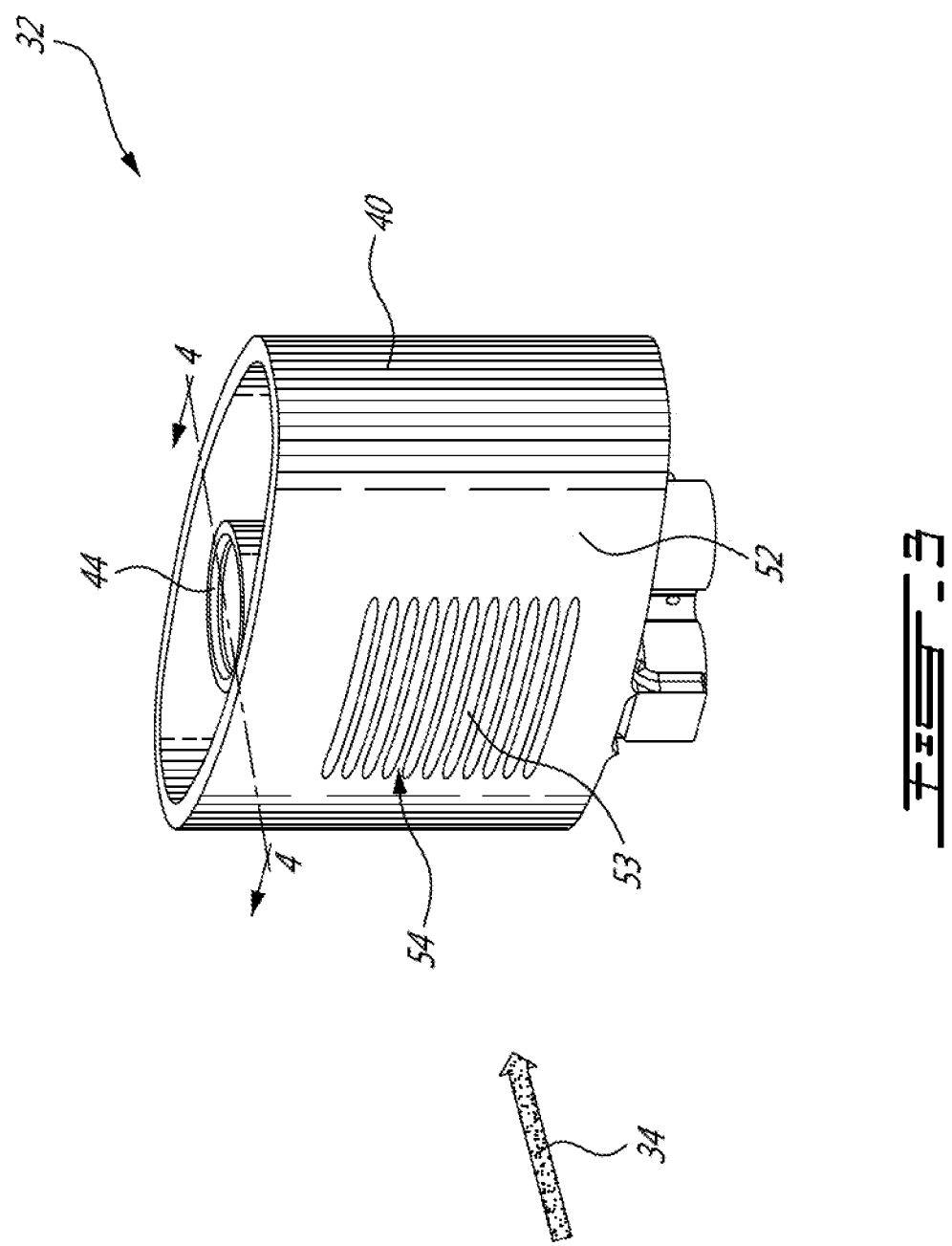
FIG. 3 is a schematic perspective view of the fuel fairing of FIG. 2.

Turning now to FIGS. 3 and 4, the fuel fairing 32 includes a fairing body 40. The fairing body 40 must be heat conductive and may, in one embodiment, be made of a lightweight metal alloy such as lightweight metal alloy such as aluminum. However, it is contemplated that the fairing body 40 could alternately be made of steel, titanium, or other materials compatible with the environment. The fairing body 40 has a generally oval shape in cross-section and is sized to fit within the bypass air duct 33. It is contemplated that the fairing body 40 could have a variety of shapes and sizes. For example, the fairing body 40 may be circular or square. The fairing body 40 may also have only a portion extending in the bypass air duct 33.

The fairing body 40 includes a central bore 44 which is sized to receive the fuel inlet tube 30. The fuel inlet tube 30 is received in a loose fit engagement in the central bore 44, such that sliding radial displacement of the fuel inlet tube 30 is allowed. A plurality of O-rings 46 (shown in FIG. 2) seal the fuel inlet tube 30 to the central bore 44.

The fairing body 40 includes a primary fuel cavity 48 and a secondary fuel cavity 50. The primary 48 and secondary 50 fuel cavities communicate with the manifold inlet channel 28 of the fuel inlet tube 30 when the fuel inlet tube 30 is inserted in the fuel fairing 32 via respective primary and secondary fuel channels 49, 51. The primary 49 and secondary 51 fuel channels are disposed diametrically from each other about the central bore 44. The primary 49 and secondary 51 fuel channels have respective fuel inlets 49a, 51a in fluid communication with a pressurised fuel system, and fuel outlets 49b, 51b in fluid communication with the manifold inlet channel 28. It is contemplated that the primary 49 and secondary 51 fuel channels could, instead, be disposed next to each other. It is also contemplated that the fairing body 40 could have only one or more than two fuel channels.

The fairing body 40 has an outer surface 52 which includes a heat exchanging surface 53 in contact with the core flow 34 of relatively cooled air. In one embodiment, the heat exchanging surface 53 includes a plurality of heat exchanging structures 54. The heat exchanging structures 54 are disposed in the fairing body 40 right behind the primary 49 and secondary 51 fuel channels so as to be in heat transfer communication and to cool the fuel before it reaches the fuel inlet tube 30 and subsequently the fuel manifold 22.

In the example shown in the figures, the plurality of heat exchanging structures 54 is a plurality of fins 56 which are defined by grooves 58 in the outer surface 52. The heat exchanging structures 54 are shown herein to be parallel to the engine axis 11, however, the heat exchanging structures 54 could be at an angle with the engine axis 11. For example, the heat exchanging structures 54 could be perpendicular to the engine axis 11. The heat exchanging structures 54 could also be a combination of structure having different orientation, such as a combination of heat exchanging structures parallel to the engine axis 11 and heat exchanging structures perpendicular to the engine structure. The heat exchanging structure 54 are shaped and sized to provide a larger contact area between the outer surface 52 and the core flow 34 than the outer surface 52 would have should the heat exchanging surface 54 would not be present. The increased larger contact area favors exposition to core flow 34 and thus favors cooling of the fuel by the core flow 34.

The heat exchanging structures 54 could have different shapes. They could for example be a wavy portion of the outer surface 52, be a series of dips and valleys, or outwardly extending fins. While the heat exchanging structure 54 are shown in the figures to be defined through grooves 58 in the outer surface 52, thereby thinning locally the outer surface 52, it is contemplated that the heat exchanging structures 54 could be defined through fins instead which would lead to a local thickening of the outer surface 52. It is also contemplated that the heat exchanging surface 53 could be made of a material different from that of a rest of the fairing body 40. For example, the heat exchanging surface 53 could be made of a heat exchanging material, while a rest of the fairing body 40 could be made of a material allowing less or no heat exchange.

The heat exchanging structures 54 may be shaped and sized to cool the fuel up to a predetermined temperature. In one embodiment, the predetermined temperature is a coking temperature of the fuel. By having the fuel cooled to a temperature below the coking temperature, clogging of the fuel nozzle assemblies 26 may be prevented. Temperatures of the fuel inside the fuel manifold ring 22 may vary. For example, a temperature of the fuel at a top of the fuel manifold ring 22 may be higher than at a bottom of the fuel manifold ring 22 due to increased time spent in the fuel manifold ring 22 at proximity to the hot combustor 16. The heat exchanging structures 54 may be sized and shaped so that, at any point inside the fuel manifold 22, the fuel temperature is below the predetermined temperature.

The primary 49 and secondary 51 fuel channels may be shaped so as to increase a time the fuel spends in proximity of the heat exchanging structures 54 to benefit from the heat transfer before it reaches the manifold inlet channel 26. In the example shown herein, the primary 49 and secondary 51 fuel channels include respectively a U-turn 57, 58 connecting respective first portions 60, 64 of the primary 49 and secondary 51 fuel channels to second portions 62, 66 of the primary 49 and secondary 51 fuel channels. The first portions 60, 64 are disposed right behind the heat exchanging surface 53. A flow of fuel from the primary 48 and secondary 50 cavities through the primary 49 and secondary 51 fuel channels toward the manifold inlet channel 28 is illustrated by arrows 70 (first portions 60, 64 then U-turn 57, 58, then second portions 62, 66). Pressure in the fuel system enables unidirectional flow from the primary 48 and secondary 50 cavities to the manifold inlet channel 28. It is contemplated that the primary 49 and secondary 51 fuel channels could be shaped differently to increase a time spent by the fuel at proximity of the heat exchanging structures 54. The primary 49 and secondary 51 fuel channels could for example be serpentine shaped or zigzag shaped.

Turning to FIG. 5, a method of method 80 supplying fuel to the fuel manifold ring 22 will be described.

The method 80 starts at step 82 by directing the fuel through a fuel fairing 40. The fuel is part of a pressurised system and is forced into the fuel inlets 49a, 51a of the primary 49 and secondary 51 fuel channels of the fuel manifold ring 22. From the fuel inlets 49a, 51a, the fuel travels in the respective first portions 60, 64 of the primary 49 and secondary 51 fuel channels that are right behind the heat exchanging structures 54.

From step 82, the method 80 goes to step 84, where the fuel is cooled in the respective first portions 60, 64 of the primary 49 and secondary 51 fuel channels due to their proximity with the heat exchanging surface 53. The heat exchanging structures 54 are in contact with the flow of air 34 of the bypass duct 33 which is cooler than the fuel flowing into the fuel fairing 40. The contact with the cooler air 34 cools the heat exchanging surface 53 which by its properties transmit the cooler temperature to the fuel. As mentioned above, the fuel is cooled to a temperature below a predetermined temperature, which may correspond to a coking temperature that the fuel may have while in the fuel manifold ring 22. After passing through the first portions 60, 64 of the primary 49 and secondary 51 fuel channels, the fuel goes through the respective U-turns 57, 58 and in the respective second portions 62, 66 of the primary 49 and secondary 51 fuel channels. The fuel may be cooled further in the second portions 62, 66 of the primary 49 and secondary 51 fuel channels.

From step 84, the method 80 goes to step 86, where the cooled fuel is fed to the manifold inlet channel 28 of the inlet tube 30 via the fuel outlets 49b, 51b of the primary 49 and secondary 51 fuel channels. The manifold inlet channel 28 carries the fuel to the fuel manifold ring 22 for pulverisation inside the combustor 16.

The above described methods and device may prevent the fuel from cooking by lowering a temperature of the fuel before it enters the ring manifold. The heat exchanging surface and/or structures may be implemented in the fuel fairing without burdensome modifications of current processes.

The above description is meant to be exemplary only, and one skilled in the art will recognize that changes may be made to the embodiments described without departing from the scope of the invention disclosed. For example, the above described fuel fairing could be used in a turbofan engine. Still other modifications which fall within the scope of the present invention will be apparent to those skilled in the art, in light of a review of this disclosure, and such modifications are intended to fall within the appended claims.

The invention claimed is:

1. A method of supplying fuel to an internal fuel manifold of a bypass gas turbine engine, the method comprising:
providing a fuel fairing extending within a fan bypass duct of the bypass gas turbine engine, the fuel fairing having a fairing body with a heat exchanging structure on an outer surface thereof, and the outer surface being exposed to cool bypass airflow in the fan bypass duct, and a fuel channel extending through the fuel fairing between a fuel inlet and a fuel outlet, the fuel channel in heat transfer communication with the heat exchanging structure on the outer surface of the fairing body;
directing a fuel flow through the fuel channel of the fuel fairing to cool the fuel flow below a coking temperature of the fuel, the fuel channel being disposed within an outer wall of the fairing body and entirely within the fan bypass duct, the outer wall having the outer surface with the heat exchanging structure, the outer wall of the fairing body being disposed between the outer surface and a central bore within the fairing body receiving an inlet tube of the internal fuel manifold; and
subsequently feeding the cooled fuel flow from the fuel fairing to the inlet tube of the internal fuel manifold, within the fairing body.

2. The method of claim 1, wherein the fuel channel includes first and second channel portions extending parallel to each other within the outer wall of the fairing body disposed within the fan bypass duct, the first channel portion being closer than the second channel portion to the outer surface of the fairing body having the heat exchanging structure and the second channel portion being disposed inwardly from the first channel portion, the second channel portion being closer than the first channel portion to a center of the fairing body, and directing fuel through the first channel portion and then the second channel portion, before feeding the fuel flow from the fuel fairing to the internal fuel manifold.

3. The method of claim 1, wherein cooling the fuel in the fuel fairing below the coking temperature of the fuel comprises using a plurality of heat exchanging fins disposed on the outer surface of the fuel fairing.

4. A method of reducing coking in an internal fuel manifold of a bypass gas turbine engine, the method comprising:
i) cooling a flow of fuel below a predetermined temperature by directing the fuel through a fuel channel within a fuel fairing located within a fan bypass duct of the gas turbine engine, at least an outer surface of the fuel fairing being exposed to cool bypass airflow through the fan bypass duct, the fuel channel being disposed within an outer wall of a fairing body and entirely within the fan bypass duct, the outer wall having the outer surface with a heat exchanging structure thereon, the outer wall of the fairing body being disposed between the outer surface and a central bore within the fairing body receiving an inlet tube of the internal fuel manifold; and then
ii) supplying the cooled fuel from the fuel fairing to the inlet tube of the internal fuel manifold, within the fairing body.

5. The method of claim 4, wherein cooling the fuel in the fuel fairing below the predetermined temperature comprises using a plurality of heat exchanging fins disposed on the outer surface of the fuel fairing.

6. The method of claim 4, wherein cooling the flow of fuel below the predetermined temperature includes using a plurality of heat exchanging structures disposed on the outer surface of the fuel fairing.

7. The method of claim 6, wherein directing fuel through the fuel fairing includes directing fuel through the fuel channel extending through the fuel fairing between a fuel inlet and a fuel outlet, the fuel channel having a portion directly behind the plurality of heat exchanging structures so as to be in heat transfer communication therewith.

8. A bypass gas turbine engine including:
a fan bypass duct carrying cool air;
an internal fuel manifold including a fuel inlet tube; and
a fuel fairing disposed at least partially in the fan bypass duct and in fluid flow communication with the internal fuel manifold, the fuel fairing including:
a fairing body having an outer surface exposed to the cool air flowing within the fan bypass duct, a central bore defined in the fairing body and receiving the fuel inlet tube of the internal fuel manifold, and at least one fuel inlet and at least one fuel outlet defined in the fairing body;
at least one fuel channel extending through an outer wall of the fairing body between the at least one fuel inlet and the at least one fuel outlet, the at least one fuel channel and the outer wall of the fairing body being entirely within the fan bypass duct, the outer wall being disposed between the outer surface of the fairing body and the central bore therein, the at least one fuel channel being in heat transfer communication with the outer surface of the fairing body;
and a plurality of heat exchanging structures disposed on the outer surface and providing a heat transfer surface having a surface area greater than a corresponding outer surface without the plurality of heat exchanging structures.

9. The gas turbine engine of claim 8, wherein the plurality of heat exchanging structures include a plurality of fins.

10. The gas turbine engine of claim 9, wherein plurality of the fins are defined by grooves in the outer surface of the fairing body.

11. The gas turbine engine of claim 8, wherein the plurality of heat exchanging structure includes a plurality of parallel structures.

12. The gas turbine engine of claim 8, wherein the central bore defines a vertical axis, and the plurality of heat exchanging structures are aligned with a horizontal axis.

13. The gas turbine engine of claim 8, wherein the at least one fuel channel has a portion disposed directly behind the plurality of heat exchanging structures so as to be in heat transfer communication therewith.

14. The gas turbine engine of claim 8, wherein the fuel channel includes a first portion and a second portion connected to the first portion by a U-turn, the first portion being the portion directly behind the plurality of heat exchanging structures.

15. The gas turbine of claim 8, wherein the fairing body has an oval shape in cross-section.

* * * * *